June 7, 1932.  C. GUGGENHEIM  1,861,496
CINEMATOGRAPH PROJECTOR
Filed Aug. 21, 1928  4 Sheets-Sheet 1
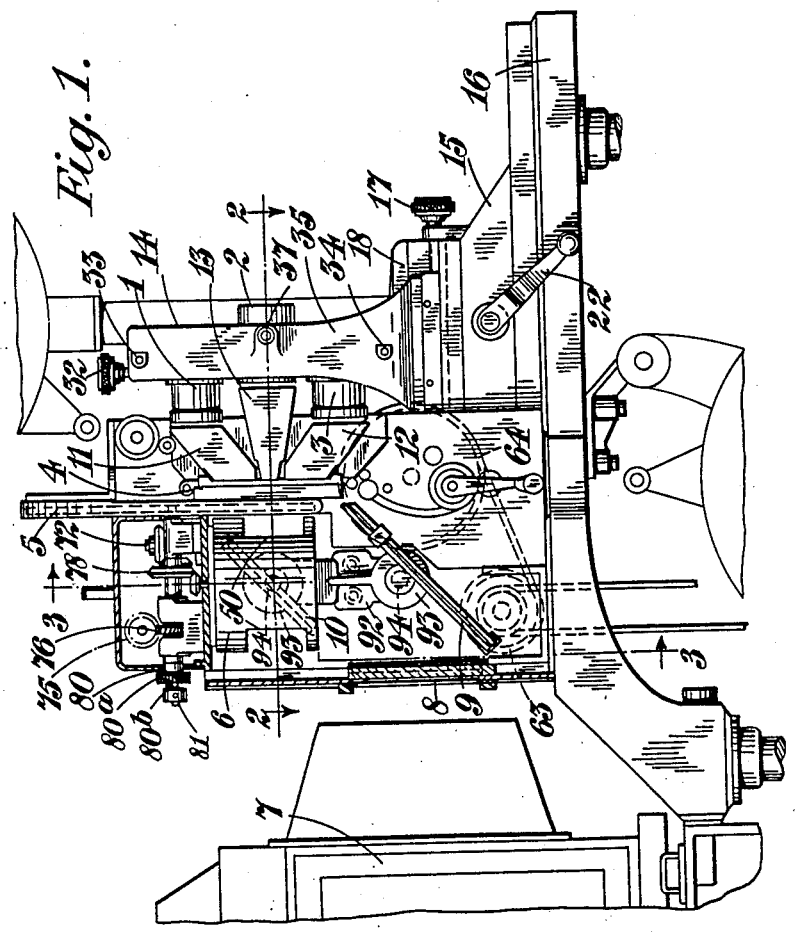

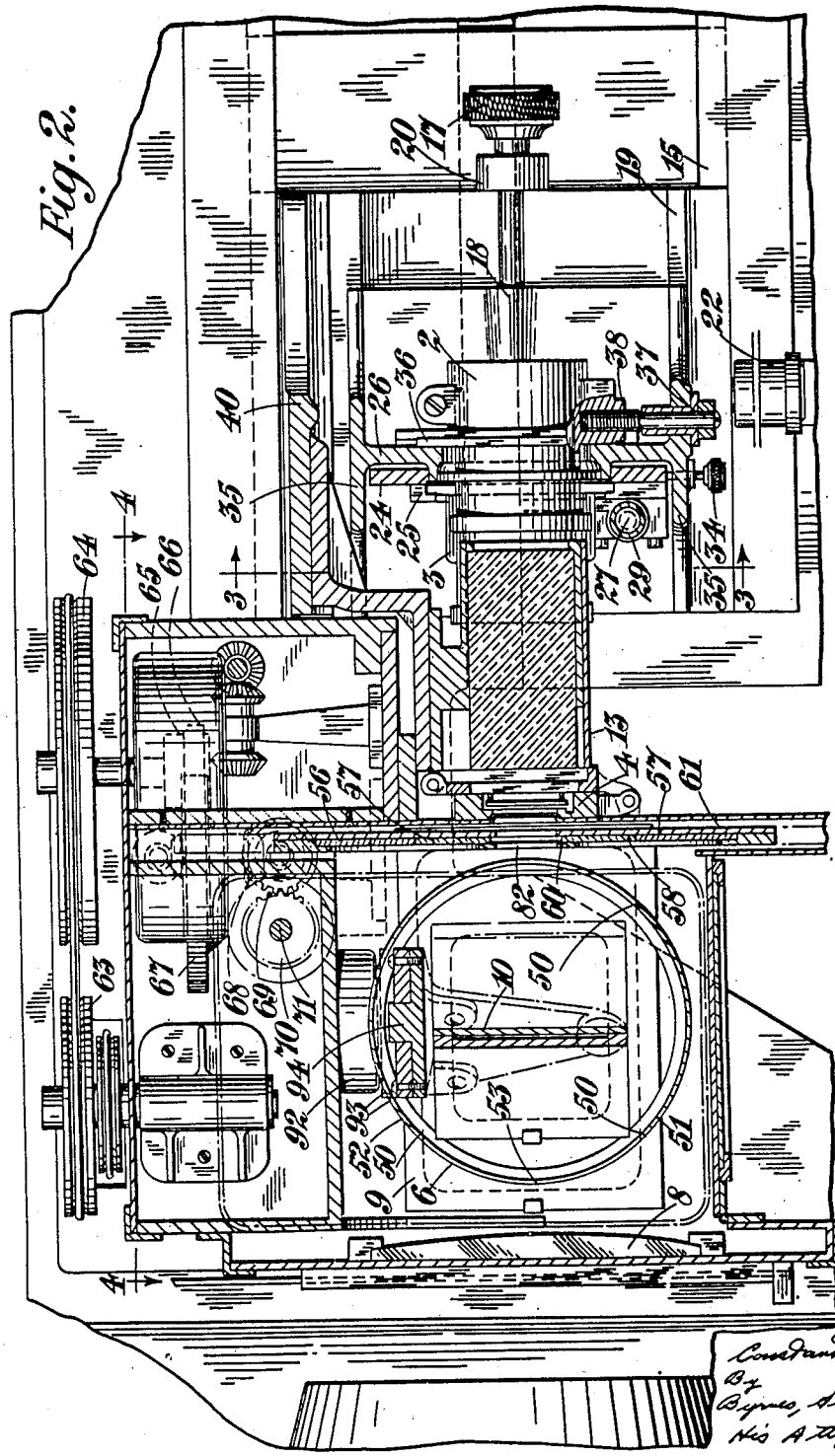

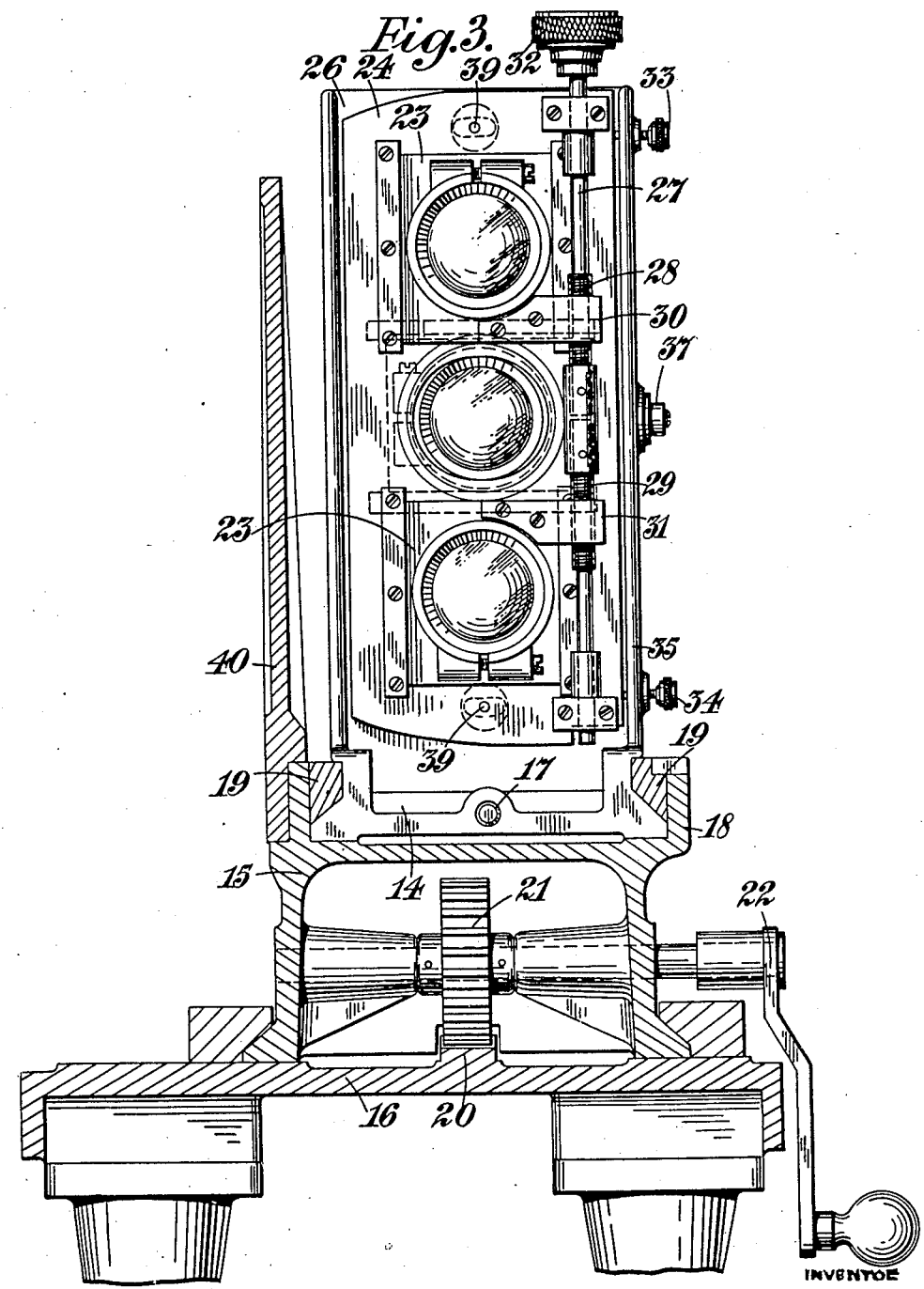

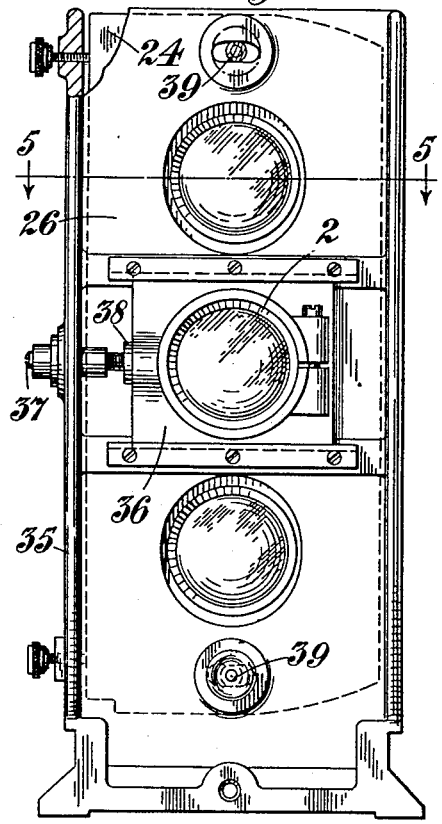

Patented June 7, 1932

1,861,496

UNITED STATES PATENT OFFICE

CONSTANT GUGGENHEIM, OF LONDON, ENGLAND, ASSIGNOR TO COOPER-GEE LIMITED, OF LONDON, ENGLAND, A BRITISH COMPANY

CINEMATOGRAPH PROJECTOR

Application filed August 21, 1928, Serial No. 300,986, and in Great Britain September 17, 1927.

This invention is for improvements in or relating to multi-lens cinematograph projectors of the colour-projection type in which three complementary picture-images representing various colour components of the scene to be depicted are projected on to the screen simultaneously through a corresponding number of lenses so that the picture-images on the screen are superposed on one another and combine to form a picture in colours, the said lenses being arranged to co-operate with a single film having the picture-images disposed in succession along it and being, for this purpose, set with their axes parallel or substantially parallel to one another and all lying in a plane parallel to the centre line of the film. The invention has for its object to provide an improved adjustable mounting for the lenses of a cinematograph projector of this type.

According to the present invention, a multi-lens cinematograph projector of the type described is characterised by an adjustable mounting for the lenses which comprises in combination a carrier for one of the lenses, which carrier is adjustable relatively to the other two lenses transversely to the plane in which the lenses lie, and means for swinging the said other two lenses as a unit around the transversely adjustable lens (the latter being adjustable within relatively small limits only) to set the optical centers of the lens system along a line parallel to the center line of the film.

A preferred construction is one in which the transversely adjustable lens is the center lens of the three and the said means for swinging the other two lenses takes the form of a cradle pivotally adjustable around the center lens and carrying the said two other lenses upon it.

According to the feature of the invention, the lenses, besides being adjustable to set the optical centers of the lens system along a line parallel to the center line of the film, may be adjustable in the direction of the length of the film for correct screen-register lengthwise of the picture. For the sake of brevity this latter adjustment of the lenses, since it takes into account the spacing of the picture-images on the film, will be referred to hereinafter as adjustment as to spacing.

According to a further feature of the invention, the means for imparting to the lenses adjustment as to spacing may comprise an operating member common to the several lenses so adjustable and may be arranged to adjust the several lenses simultaneously.

When setting up the projector for use, the swingably adjustable lenses are brought into alignment with the film in the gate, after which the transversely adjustable lens is brought into alignment with the first-mentioned lenses, and finally the lenses are adjusted as to spacing.

The invention will now be further described with reference to the accompanying drawings, which illustrate by way of example one embodiment of the invention.

In these drawings:—

Figure 1 is partly an elevation and partly a section of a projector according to the invention;

Figure 2 is a horizontal section through the projector on the line 2—2 of Figure 1;

Figure 3 is a transverse section on the line 3—3 of Figure 2, looking in the direction of the arrows shown in that figure, and Figure 4 is a front elevation of the pedestal which carries the lenses of the projector, and which is shown in Figure 3, looking in the opposite direction to that of the arrows shown in Figure 2.

Like reference numerals indicate like parts in the various figures.

The projector is one which comprises three lenses 1, 2, and 3, through which three complementary picture-images are projected simultaneously from a single film on to the screen. The optical system is so arranged that the three picture-images become superimposed upon the screen in accurate register with one another so that in the result a picture in natural colours appears. One of the three simultaneously projected picture-images has been taken through a red filter, another through a green filter and the third through a blue-violet filter and the portions of the light beam which pass respectively through the three picture images are tinted red, green and blue-violet to correspond in each case with the "colour" of the picture. The film is fed intermittently through the gate, each step of movement being equal in distance to the spacing of the picture-images on the film. Each picture of the film is, therefore, projected three times, once through the top lens 1, once through the centre lens 2, and once through the bottom lens 3. The various pictures have all been taken one at a time so that each picture is a picture-step out of phase with the picture preceding it. This does not materially impair definition, however, provided the exposure interval of the film is sufficiently small and correspondingly the film feed sufficiently rapid. Indeed, it seems rather to afford a practical advantage in that it tends to smooth out the image-motion of the projected picture. This system of projection is known in the art and does not per se form part of the invention.

The three lenses 1, 2 and 3 are mounted upon a pedestal 14 which is slidably mounted upon a carrier 15, which in turn is slidable along a bed plate 16. The bed plate 16 constitutes the top of a stand for the projector, the bottom of which rests upon the ground. The pedestal 14 has means whereby it may be finely adjusted for focussing purposes along the carrier 15. These means may take any convenient form, but in the projector which is being described a screw 17 is provided which co-operates with a nut 18 fitted in the foot of the pedestal. As the screw 17 is rotated, the pedestal is drawn along a slideway 19 provided on the carrier to receive the foot of the pedestal.

The carrier 15, together with the pedestal, is provided with means for relatively quick sliding movement along the bed plate 16. These means also may take any convenient form, but in the projector being described a rack 20 and co-operating pinion 21 are provided, the pinion being rotated by a turning handle 22.

The upper and lower lenses 1 and 3 are carried in slides 23 mounted upon a cradle plate 24, which in turn is pivotally mounted upon an annular projection or boss 25 formed on the transverse web 26 of the pedestal concentric with the centre lens. The slides 23 are capable of movement towards and away from the centre lens carrying the outer lenses with them, and they are arranged to be so moved simultaneously and to an equal degree by an operating member common to them both in the form of a shaft 27 oppositely screwthreaded at 28 and 29 for engagement with co-operating nuts 30, 31 fixed respectively to the two slides 23. The shaft 27 is rotated by the fingers through the medium of a knurled head 32. It will be appreciated that when the head 32 is turned in one direction the outer lenses are adjusted away from the centre lens simultaneously and to an equal degree, and when the head 32 is turned in the reverse direction the outer lenses are adjusted towards the centre lens simultaneously and to an equal degree.

The cradle 24 is mounted to turn approximately about the axis of a centre lens as previously stated, and it will be apreciated that the outer lenses are rotatationally adjusted about the centre lens, both simultaneously and to an equal degree when the cradle is turned about its axis. In order to effect the angular movement of the cradle two set screws 33, 34 are provided in one flange 35 of the pedestal, the inner ends of the set screws bearing upon the lateral edge of the cradle plate 24. One screw, as will be appreciated, is screwed in and the other screw is screwed out to set the cradle plate in any desired position of angular adjustment.

The centre lens is carried in a slide 36 which is slidable horizontally across the web 26 of the pedestal. Motion is imparted to the slide 36 by turning an adjusting screw 37 mounted in the web 35 of the pedestal and co-operating with a nut 38 provided on the slide. After the cradle has been turned to its correct position of adjustment it is arranged to be fixed in this position by clamping screws 39 which clamp the cradle firmly to the pedestal.

The three portions of the beam leaving the three apertures of the gate of the projector are caused to pass through three glass prisms 11, 12, and 13 before they enter the lenses. The interposition of the prisms 11 and 12 has the effect of increasing the spacing between the three beam sections and of thereby enabling larger lenses to be employed. To this end the prisms 11 and 12 are totally reflecting prisms. The center prism 13, however, is a body of plain glass and the beam section passes directly through it.

The prisms 11, 12 and 13 are mounted upon a second pedestal 40 fixed at the bottom to the carrier 15 to one side thereof. The pedestal 14 is shown more clearly in Figure 3. As will be understood, when the pedestal is moved along the carrier 15 access is afforded to the rear ends of the lenses and also that when the carrier 15 is moved along the bed plate 16 the prisms move as one with the pedestal and lenses and access is afforded to the gate of the projector.

Further, the centre prism 13 is not for bending the beam, but its function is to equalize the length of the light path through the three pictures of the film and thereby to equalize the degree of light absorption in the three portions of the beam. Obviously, therefore, the relative dimensions of the prisms should be such that the lengths of the paths of the three portions of the beam which pass respectively through the three prisms, should be equal to one another.

The colour filter of the machine may have any desired form. Conveniently, however, it may be of the rotary disc type and may be divided into three filter sectors, each of which is sub-divided into three annular sectors juxtaposed edge-to-edge and composed of differently coloured transparent material, for example glass. The filter is arranged to rotate through 120° for every step of movement of the film through the gate and the order of colour of the differently coloured segments of the three sectors is so arranged that the filter in effect follows up the picture-image as the latter takes up its three separate positions in its traverse through the gate. This form of colour filter is known in projectors of the type in question in this invention and per se forms no part of the invention.

It will be obvious that the invention is capable of many modifications. For example, the outer lenses may be pivotally mounted about a horizontal axis in relation to the centre lens, instead of being made adjustable towards and away from the centre lens. Substantially the same effect optically is obtained in either case. The sliding adjustment of the outer lenses is, generally speaking, preferable to angular adjustment as it lends itself more readily to simplicity of construction.

I claim:—

1. In a multi-lens cinematograph projector of the character specified, the combination of three lenses, a carrier for one of the lenses, which carrier is within small limits adjustable relatively to the other two lenses transversely to the plane in which the lenses lie, and means for swinging said other two lenses as a unit around the transversely adjustable lens to set the optical centres of the lens system along a line parallel to the centre line of the film.

2. In a multi-lens cinematograph projector of the character specified, the combination of three lenses, a carrier for the centre lens, which carrier is within small limits adjustable relatively to the other two lenses transversely to the plane in which the lenses lie, and means for swinging said other two lenses as a unit around the transversely adjustable lens to set the optical centres of the lens system along a line parallel to the centre line of the film.

3. In a multi-lens cinematograph projector of the character specified, the combination of three lenses, a carrier for the centre lens, which carrier is within small limits adjustable relatively to the other two lenses transversely to the plane in which the lenses lie, and a rocking cradle for the other two lenses swingable with the lenses about an axis substantially coinciding with the axis of the centre lens so as to set the optical centres of the lens system along a line parallel to the centre line of the film.

4. In a multi-lens cinematograph projector of the character specified, the combination of three lenses, a carrier for the centre lens, which carrier is within small limits adjustable relatively to the other two lenses transversely to the plane in which the lenses lie, a rocking cradle for the other two lenses swingable with the lenses about an axis substantially coinciding with the axis of the centre lens so as to set the optical centres of the lens system along a line parallel to the centre line of the film, and set screws for adjusting the position of the rocking cradle.

5. In a multi-lens cinematograph projector of the character specified, the combination of three lenses, means for adjusting the spacing of the said lenses, a carrier for one of the lenses, which carrier is within small limits adjustable relatively to the other two lenses transversely to the plane in which the lenses lie, and means for swinging said other two lenses as a unit around the transversely adjustable lens to set the optical centres of the lens system along a line parallel to the centre line of the film.

6. In a multi-lens cinematograph projector of the character specified, the combination of three lenses, a carrier for the centre lens, which carrier is within small limits adjustable relatively to the other two lenses transversely to the plane in which the lenses lie, and a rocking cradle for the other two lenses swingable with the lenses about an axis substantially coinciding with the axis of the centre lens so as to set the optical centres of the lens system along a line parallel to the centre line of the film, the lenses on the cradle being adjustable towards and away from the centre lens.

7. In a multi-lens cinematograph projector of the character specified, the combination of three lenses, a carrier for the centre lens, which carrier is within small limits adjustable relatively to the other two lenses transversely to the plane in which the lenses lie, a rocking cradle for the other two lenses swingable with the lenses about an axis substantially coinciding with the axis of the centre lens so as to set the optical centres of the lens system along a line parallel to the centre line of the film, the lenses on the cradle being adjustable towards and away from the centre lens, and means for effecting this adjustment of these lenses involving a manipulating member common to both lenses and operating to adjust them both simultaneously.

8. A multi-lens cinematograph projector of the character described comprising the combination with the parts set forth in claim 1 of a pedestal carrying said parts and slidable towards and away from the film gate of the projector, and means whereby the position of the pedestal in relation to the gate may be finely adjusted for focusing purposes.

9. A multi-lens cinematograph projector of the character described, comprising the combination with the parts set forth in claim 1, of a pedestal carrying said parts and slidable towards and away from the film gate of the projector, means whereby the position of the pedestal in relation to the gate may be finely adjusted for focusing purposes, a carrier upon which the pedestal is mounted, and a bed plate along which the carrier is slidable towards and way from the gate to remove the lenses from the gate for access to the latter.

10. A multi-lens cinematograph projector of the character described, comprising the combination with the parts set forth in claim 1, of a pedestal carrying said parts and slidable towards and away from the film gate of the projector, means whereby the position of the pedestal in relation to the gate may be finely adjusted for focusing purposes, a carrier upon which the pedestal is mounted, a bed plate along which the carrier is slidable towards and away from the gate to remove the lenses from the gate for access to the latter, and means for effecting quick sliding movement of the carrier along the bed plate.

In testimony whereof I affix my signature.

CONSTANT GUGGENHEIM.